(12) United States Patent
Ferreira Filho et al.

(10) Patent No.: US 9,951,992 B2
(45) Date of Patent: Apr. 24, 2018

(54) METALLURGICAL FURNACE

(71) Applicant: Tecnored Desenvolvimento Tecnologico S.A., São Paulo (BR)

(72) Inventors: Hermes Joaquim Ferreira Filho, São Paulo (BR); Kleiton Gonçalves Lovati, São Paulo (BR)

(73) Assignee: Tecnored Desenvolvimento Tecnologico S.A. (BR)

( * ) Notice: Subject to any disclaimer, the term of this patent is extended or adjusted under 35 U.S.C. 154(b) by 0 days.

(21) Appl. No.: 15/107,781

(22) PCT Filed: Dec. 22, 2014

(86) PCT No.: PCT/BR2014/050053
§ 371 (c)(1),
(2) Date: Jun. 23, 2016

(87) PCT Pub. No.: WO2015/095946
PCT Pub. Date: Jul. 2, 2015

(65) Prior Publication Data
US 2016/0320125 A1 Nov. 3, 2016

(30) Foreign Application Priority Data

Dec. 27, 2013 (BR) .............. 102013033702

(51) Int. Cl.
*F27D 7/02* (2006.01)
*F27B 1/16* (2006.01)
(Continued)

(52) U.S. Cl.
CPC ............. *F27B 1/16* (2013.01); *C21B 7/16* (2013.01); *C21B 11/02* (2013.01); *F27B 1/02* (2013.01);
(Continued)

(58) Field of Classification Search
CPC ...................................................... F27D 7/02
(Continued)

(56) References Cited

U.S. PATENT DOCUMENTS 3,701,517 A 10/1972 Gray
3,861,859 A 1/1975 Sherwood
(Continued)

FOREIGN PATENT DOCUMENTS

WO 8802838 A1 4/1988

OTHER PUBLICATIONS

International Search Report for Application No. PCT/BR2014/050053 dated Feb. 5, 2015.
(Continued)

*Primary Examiner* — Scott Kastler
(74) *Attorney, Agent, or Firm* — Lerner, David, Littenberg, Krumholz & Mentlik, LLP

(57) ABSTRACT

The present invention pertains to metallurgical processes and equipment and, more particularly, to a metallurgical furnace capable of operating with a broad range of broad range of raw materials and fuels, including those with high levels of impurities. Accordingly, the metallurgical furnace of the present invention comprises (i) at least an upper tub, (ii) at least a lower tub, (iii) at least a fuel feeder positioned substantially between the at least an upper tub and the at least a lower tub, (iv) at least a row of tuyeres positioned on at least one of at least an upper tub and at least a lower tub, the at least a row of tuyeres fluidly communicating inside the furnace with the outside environment, and (v) at least a burner positioned on at least one of at least an upper tub and at least a lower tub. The use of at least a burner jointly with the at least a row of tuyeres generates a very intense release of heat by virtue of the exothermic reactions which occur by this combination.

6 Claims, 2 Drawing Sheets

(51) Int. Cl.
*F27B 1/02* (2006.01)
*F27B 1/10* (2006.01)
*C21B 11/02* (2006.01)
*C21B 7/16* (2006.01)
*F27D 99/00* (2010.01)
*C21C 5/56* (2006.01)

(52) U.S. Cl.
CPC .................. *F27B 1/10* (2013.01); *F27D 7/02* (2013.01); *F27D 99/0033* (2013.01); *C21C 5/56* (2013.01); *Y02P 10/136* (2015.11)

(58) Field of Classification Search
USPC ........................................................ 266/197
See application file for complete search history.

(56) References Cited

U.S. PATENT DOCUMENTS

| | | | |
|---|---|---|---|
| 3,958,949 A | | 5/1976 | Plantif et al. |
| 4,019,895 A | | 4/1977 | Santen |
| 5,149,363 A | * | 9/1992 | Contrucci ............... C21B 11/02 75/414 |
| 6,692,688 B2 | | 2/2004 | Contrucci et al. |

OTHER PUBLICATIONS

Niehoff, T., et al., "Oxy-fuel burner technology for cupola melting", 2nd International Cupola Conference, Trier. Mar. 19, 2004. Disponivel em, <https://www.airproducts.com/~/media/Files/PDF/industries/metals-oxy-fuel-burner-technology-aluminum-lecture.pdf>, Acessado em Apr. 2, 2015.

\* cited by examiner

METALLURGICAL FURNACE

CROSS REFERENCE TO RELATED APPLICATIONS

The present application is a national phase entry under 35 U.S.C. § 371 of International Application No. PCT/BR2014/050053 filed Dec. 22, 2014, published in Brazil, which claims priority from Brazilian Patent Application No. BR102013033702-1 filed Dec. 27, 2013, all of which are incorporated herein by reference.

TECHNICAL FIELD

The present invention pertains to metallurgical processes and equipment. More particularly, the present invention pertains to metallurgical processes and equipment for producing metal alloys or not.

DESCRIPTION OF THE STATE OF THE ART

Classic processes of obtaining pig iron are already known such as, for example, blast furnaces and electric reduction furnaces. Other processes of obtaining alloys from iron oxide or iron ores after particle size conditioning, classic pellets or other traditional agglomerates are also known, for obtaining, by traditional operations in these furnaces, liquid or solid iron from a certain composition.

In blast furnaces, the load that can be comprised of classified ore, pellets, sinter or other classic agglomerates, coke and limestone are sequentially loaded through the upper part of the furnace, forming a continuous column. Atmospheric air is introduced into the lower part of the blast furnace, pre-heated in regenerative heaters or not, at an approximate temperature of 300 to 1200° C., by way of a row of tuyeres in the upper part of a crucible. At this site, a zone is formed having a reductive atmosphere due to the presence of carbon monoxide, formed by the reaction of $CO_2$ with the carbon from the coke. This CO combines with the oxygen from the iron oxide, reducing it to metal iron and producing pig iron.

The impurities, that is, the ore gangue and the coke ash form with limestone a liquid slag, less dense, which floats on the surface of the molten pig iron.

The gases formed in counter-current with the load preheat it and leave it from the upper part. This gas is mainly comprised of CO, $CO_2$, $H_2$ and $N_2$, being forwarded to the fuel air regenerative pre-heaters that enters into the furnace and into the other heating devices.

It is also known that in classic pellets the reduction is carried out by reducing the load oxidized by the CO generated from the partial combustion of the coke. The CO spreads to the inside of the agglomerate or the ore particles, the reduction occurring in accordance with the reaction $MeO+CO \rightarrow Me+CO_2$. The $CO_2$ generated in this reaction spreads in the opposite direction to the CO and incorporates into the gas current leaving the furnace through the top. This reaction requires a certain time for complete CO diffusion inside the ore or the classic pellet, thus requiring furnaces with high load residence times on the inside thereof, as is typical of blast furnaces.

The self-reducing pellets, in turn, present considerably more favorable conditions for reduction. The most intimate contact between the ore or oxide and the carbon material, which are finely divided, provides a lower reaction time insofar as there is no need for the CO diffusion stage to the inside of the, the reduction occurring by the reactions below, pre-constructed inside the pellet with this objective:

$$2MeO+C \rightarrow 2Me+CO_2$$

$$CO_2+C \rightarrow 2CO$$

$$MeO+CO \rightarrow Me+CO_2$$

In this sense, the agglomerate itself establishes, in practice, a semi-closed system in which the atmosphere is reductive during the entire time period in which carbon is available inside. Alternatively, the self-reducing agglomerates, as the name itself, maintain on their inside a self-reducing atmosphere that does not depend on the characteristics of the outside atmosphere, that is, on the type of atmosphere existing inside the shaft furnace provided by the rising gases.

Accordingly, it is possible to convert into energy for the process the CO present in the atmosphere of the furnace originating from the partial burning of the fuel and from the reduction reaction which is processed inside the pellets.

In contrast, in the melting processes in shaft furnaces, the presence of coke or another solid fuel, loaded through the top during the operation, runs a downward trajectory with the remainder of the load, reacting with the rising $CO_2$ in a counter-current regime, according to the Boudouard reaction $CO_2+C_2 \rightarrow 2CO$, the consumption of carbon material thus being greater, without resulting in an effective utilization in the reduction-melting process. It if were possible to burn this CO gas in the process itself, greater efficiency would be obtained, resulting in an economy of fuel coke in cupola furnaces and of fuel and of reduction in high furnaces, as in the case of all other shaft furnaces employed in reduction/melting or just melting of any other metal alloy.

Document PI9403502-4, owned by the Applicant, solves the problem cited above by providing a furnace comprising a fuel feeder separate from the load entrance (raw material). Particularly, the furnace described in document PI9403502-4 presents an upper tub, which receives the load (oxides/ores, for example) and a lower tub, and the fuel is inserted approximately at the juncture between the two tubs.

The gases originating from the lower zone, in counter-current to the load, transfer thereto the thermal energy needed for heating and for reduction or simple melting. Since the load in the upper tub does not present coke, charcoal or any other solid fuel, the Boudouard reaction does not occur ($CO_2+C \rightarrow 2CO$), which is endothermic, and which additionally consumes appreciable quantities of carbon. So the exhaust gases leaving the equipment essentially comprise $CO_2$ and $N_2$.

However, despite having countless advantages, such as those cited above, the furnace described in document PI9403502-4 does not enable raw materials or fuels with a high content of impurities to be used because they generally do not provide enough heat for melting many of these impurities.

Objectives of the Invention

The objective of the present invention is to provide a metallurgical furnace with a high and efficient heat power capable of using raw materials and fuels with high levels of impurities.

SUMMARY DESCRIPTION OF THE INVENTION

In order to achieve the objectives described above, the present invention provides a metallurgical furnace, comprising (i) at least an upper tub, (ii) at least a lower tub, (iii) at least a fuel feeder positioned substantially between the at least an upper tub and the at least a lower tub, and (iv) at least a row of tuyeres positioned on at least one of at least an upper tub and at least a lower tub, the at least a row of tuyeres fluidly communicating inside the furnace with the outside environment, wherein the furnace of the present invention additionally comprises (v) at least a burner positioned on at least one of at least an upper tub and at least a lower tub.

DESCRIPTION OF THE DRAWINGS

The detailed description set forth ahead makes reference to the accompanying drawings, wherein.

DETAILED DESCRIPTION OF THE INVENTION

The following description is based on a preferred embodiment of the invention. As it will be evident for any person skilled in the art, however, the invention is not limited to this particular embodiment. Additionally, the content of document PI9403502-4 is incorporated herein as reference.

The present invention provides a metallurgical furnace endowed with innovations that enable the consumption of different fuel materials to generate energy for the process, besides the use of raw materials with high levels of impurity when compared with classic metalworking techniques. Additionally, the furnace of the present invention permits the burning of the CO or any other fuel gas present in the rising gas, such as $H_2$, $CH_4$, etc.

Figure 1:
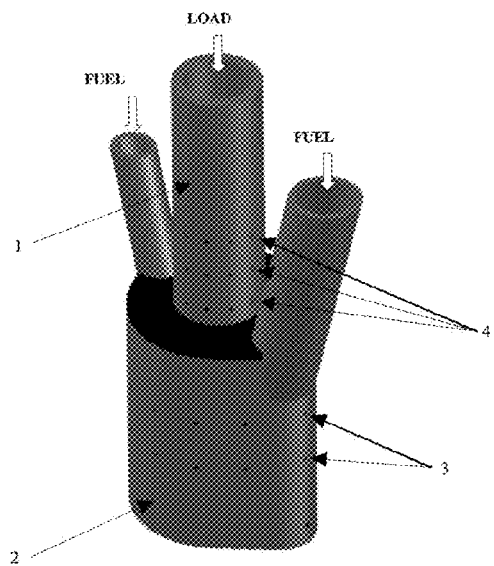
FIG. 1 illustrates a first embodiment of the metallurgical furnace according to the present invention.
Figure 2:
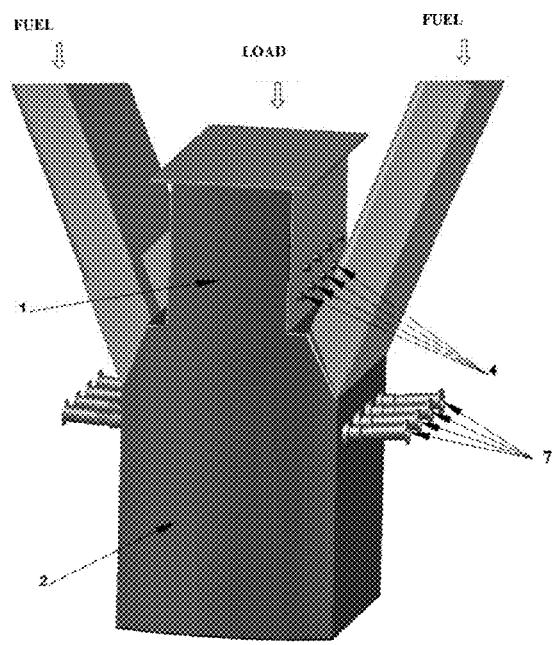
FIG. 2 illustrates a second embodiment of the metallurgical furnace according to the present invention.

The metallurgical furnace of the present invention is illustrated in FIGS. 1 and 2, being essentially comprised of an upper tub 1 where the load (raw material) is loaded in the furnace. As can be noted, FIG. 1 illustrates a cylinder-shaped tub (circular cross section), whereas FIG. 2 shows a parallelepiped-shaped tub (rectangular cross section). It is thus emphasized that the present invention is not limited to any specific shape of the furnace.

In the upper tub 1 there is a set of at least a row of secondary tuyeres 4, which are preferably orifices that enable inflation of hot or cold atmospheric air for burning the CO and other combustible gases present in the rising gas. The inflated air may potentially comprise enrichment of $O_2$. Additionally, gaseous, liquid or solid fuel may be injected through the tuyeres 4 jointly with the inflated air.

The furnace of the present invention further comprises a lower tub 2, having a preferably circular or rectangular cross section, having a diameter or being sufficiently sized to feed the solid fuel. The diameter or width of the cross section of the tub 2 is greater than that of the tub 1 sufficient for positioning fuel feeders. In the feeders, located around the juncture of the upper tub 1 with the lower tub 2, fuel supply ducts 5 may be coupled to guarantee the fuel load to the bed of the furnace preventing the occurrence of load drag when using fine materials. With the descent of the load into the feeder, there occurs pre-heating, pre-drying and distillation of the volatile fractions present in the solid fuels and combustible carbon residues.

The lower tub 2 has one or more rows of primary tuyeres 3 which, just like the secondary tuyeres described above, are for inflating hot or cold air, and may also be enriched with $O_2$ or not. Solid fuels in powder, liquid or gaseous form may also be injected for partial burning of the fuel, producing gas and providing thermal energy necessary for reduction and/or melting the load.

If the hot air is inflated into the primary 3 and/or secondary 4 tuyeres, inflation sets 7 may be used, as illustrated in FIG. 2, which may be connected to any air-heating system (not shown) known in the state of the art.

Optionally, the lower tub 2 may have a refractory coating and/or have cooled panels.

Figure 3:
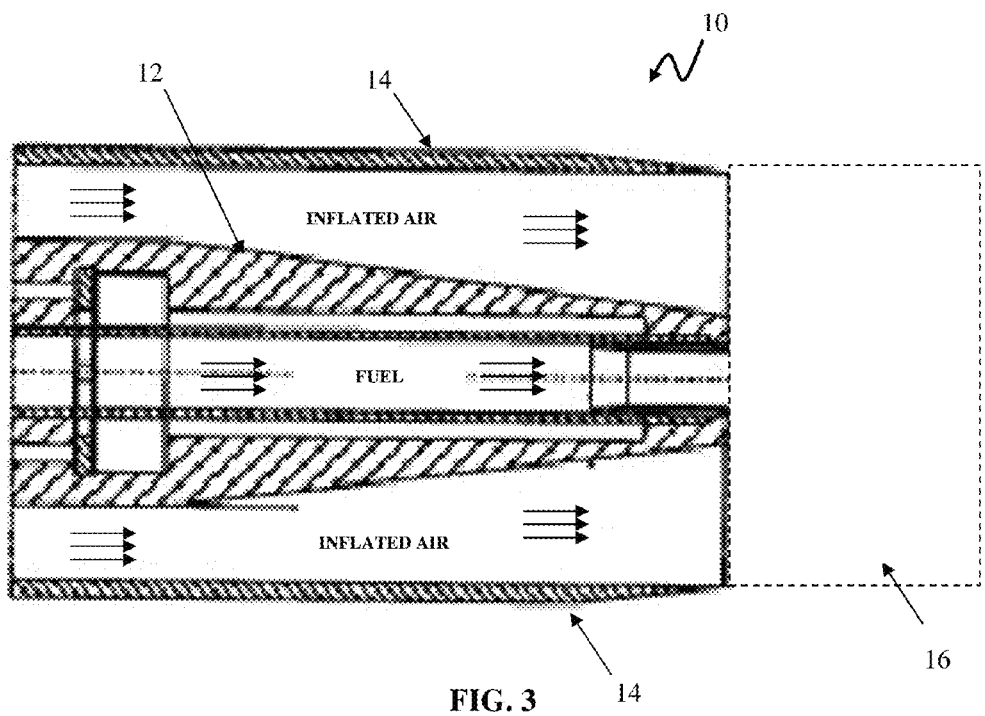
FIG. 3 illustrates a burner according to a preferred embodiment of the present invention.

Additionally, at least part of the primary or secondary tuyeres 3, 4 comprises gas burners 10, as illustrated in FIG. 3. These burners 10 positioned on the tuyeres 4 preferably comprise a coaxial tube, that is, a small central tube 12, through where the fuel is injected, and an outer tube 14 which envelopes it, through which the air is blown through the tuyeres 3, 4 or any other comburent. Thus, inflated air passes through the outer tube of the burner, while the fuel passes through the central tube 12. The air is then mixed with the fuel so that the mixture is burned in the region 16 downstream of the burner, and this region 16 is located inside the furnace. Greater safety is thus guaranteed for the burning process, since the mixture of the fuel with the comburent and subsequent burning only occur inside the furnace.

The combination of the air blown into the tuyeres 3, 4 with the injected fuel (gas, liquid or solid) and burned in the burners 10 generates a very intense release of heat by virtue of the exothermic reactions which occur by this combination.

The complete burning of the CO and of the combustible gases present may generate gaseous products such as $CO_2$ and $H_2O$.

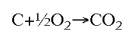

$$C + \tfrac{1}{2}O_2 \rightarrow CO_2$$

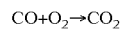

$$CO + O_2 \rightarrow CO_2$$

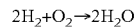

$$2H_2 + O_2 \rightarrow 2H_2O$$

The molten materials leave the equipment by the lower part of a crucible, situated in the lower part of the lower tub 2, by way of outflow tap(s) in a continuous manner or not.

This additional heat provided by the burners is extremely necessary for raw materials with a high content of impurities, that is, the ore gangue and the ashes from the coke or charcoal, since they end up withdrawing much heat from the process. Therefore, the combination of air blown into the tuyeres 3, 4 with injected fuel (gas, liquid or solid) and burned in the burners 10, generates the heat necessary for reducing raw materials with a high content of impurities and melting the high amount of slag generated by these impurities.

Besides the combustion products, the burning assisted by the combustion from the burners 10 provides enough heat for the load of self-reducing agglomerates, fuel agglomerates, pig iron, scrap iron, sponge iron, ores or composition of varied proportions of these materials, permitting a broad range of raw materials and fuels to carry out the metalworking process of preparing the alloys.

The furnace of the present invention therefore permits the fuel not to be loaded with the load in the upper part of the tub, thus differing from the classic manufacturing processes and, consequently, preventing carbon gasification reactions (Boudouard reactions) and increasing both heat and fuel consumption in the furnace.

With the improvements relating to tubs and distinct reaction zones, flexibility in term of shape of the tubs, and the presence of burners in the tuyeres, the furnace according to the present invention makes better use of the heat from the fuel burning, reducing consumption and boosting performance. This is because, different to classic manufacturing technologies, such as blast furnaces or other shaft furnaces, the carbon monoxide and other gases formed in the lower part of the furnace may be burned in the upper part, transferring thermal energy to the load which descends the tub. In other words, the gases originating from the lower zone, in counter-current with the load, are burned in the upper tub and transfer the thermal energy necessary for heating, to the reduction and/or simple melting of the load.

The metallurgical furnace proposed in the present invention, due to its high heat power and efficiency, permits greater flexibility in operations, and can be used for melting scrap iron, pig iron, sponge iron, metal materials returning from melting or steel mills, as well as any alloys, such as, for example, those used in classic cupola furnaces.

Figure 4:
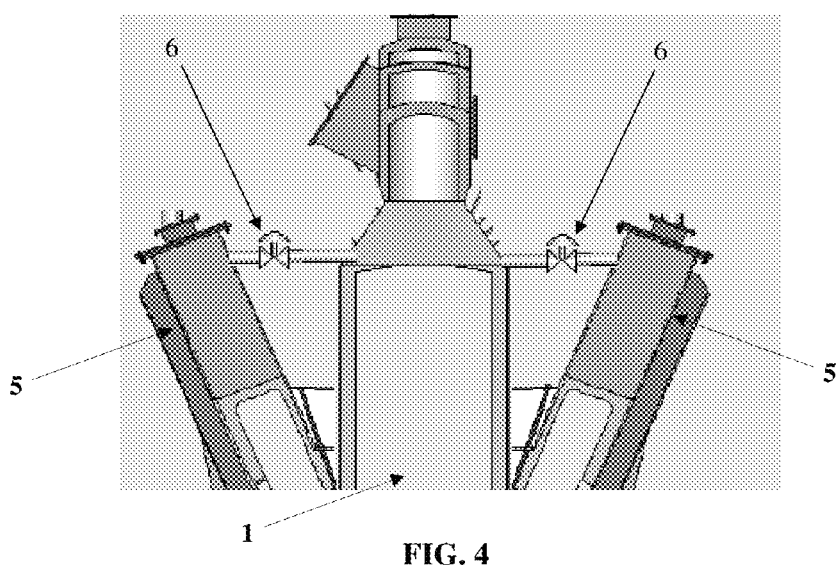
FIG. 4 illustrates gas evacuation devices pursuant to an alternative embodiment of the present invention.

Optionally, the present invention provides seal tight valves for feeding solid fuel. Also optionally, the solid fuel feeder section may comprise gas evacuation devices by way of flow control valves 6 (FIG. 4) capable of guaranteeing the passage of a certain quantity of gases to promote pre-heating, pre-drying and distillation of the volatile fractions present in various solid fuels. Particularly, the gas evacuation devices enable the exchange of gases between the fuel supply ducts 5 and the upper tub 1.

There are countless variations within the scope of protection of the present application. Accordingly, it is emphasized that the present invention is not limited to the particular arrangements/embodiments described above.

The invention claimed is:

1. A metallurgical furnace, comprising:
   at least an upper tub;
   at least a lower tub;
   at least a fuel feeder positioned substantially between the at least an upper tub and the at least a lower tub; and
   at least a row of tuyeres positioned on at least one of the at least an upper tub and the at least a lower tub, the at least a row of tuyeres fluidly communicating inside the furnace with an outside environment; and
   at least a burner positioned on at least one of the at least an upper tub and the at least a lower tub, wherein the burner comprises a central tube through which fuel is injected, and an outer tube which envelopes the central tube, through which a comburent passes, and wherein the comburent and fuel are mixed and burned inside the furnace in a region downstream of the burner.

2. The metallurgical furnace as claimed in claim 1, wherein the at least a burner is positioned on at least a row of tuyeres.

3. The metallurgical furnace as claimed in claim 1, wherein the comburent is atmospheric air inflated by the tuyeres.

4. The metallurgical furnace as claimed in claim 1, further comprising at least a fuel supply duct coupled to the at least a fuel feeder.

5. The metallurgical furnace as claimed in claim 4, wherein the at least a fuel feeder comprises at least one of a seal tight valve and gas evacuation device.

6. The metallurgical furnace as claimed in claim 1, wherein at least one of the at least an upper tub and at least a lower tub comprises a circular or rectangular cross section.

* * * * *